United States Patent
Lin et al.

(10) Patent No.: US 11,673,818 B2
(45) Date of Patent: Jun. 13, 2023

(54) SYSTEM AND METHOD OF TREATING WASTE WATER

(71) Applicant: Industrial Technology Research Institute, Hsinchu (TW)

(72) Inventors: Guan-You Lin, Hsinchu County (TW); Yi-Fong Pan, Kaohsiung (TW); Sin-Yi Huang, Miaoli County (TW); Hsin-Ju Yang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 280 days.

(21) Appl. No.: 17/137,350

(22) Filed: Dec. 30, 2020

(65) Prior Publication Data

US 2022/0204367 A1    Jun. 30, 2022

(51) Int. Cl.
  *C02F 1/469*    (2023.01)
  *B01D 61/44*    (2006.01)
  (Continued)

(52) U.S. Cl.
  CPC .......... *C02F 1/4693* (2013.01); *B01D 61/445* (2013.01); *B01D 61/46* (2013.01);
  (Continued)

(58) Field of Classification Search
  CPC .... B01D 61/445; B01D 61/46; B01D 61/462; B01D 61/464; B01D 61/465; B01D 61/466; B01D 61/467
  See application file for complete search history.

(56) References Cited

U.S. PATENT DOCUMENTS 4,404,081 A * 9/1983 Murphy ................. B01D 61/46
  204/253
4,536,269 A * 8/1985 Chlanda .................... C25B 1/22
  204/538
(Continued)

FOREIGN PATENT DOCUMENTS

CN      103282112      9/2013
CN      105833729      8/2016
(Continued)

OTHER PUBLICATIONS

Haiyang Yan et al., "In-Situ Combination of Bipolar Membrane Electrodialysis with Monovalent Selective Anion-Exchange Membrane for the Valorization of Mixed Salts into Relatively High-Purity Monoprotic and Diprotic Acids," Membranes (Basel), vol. 10, No. 6, Jun. 26, 2020, pp. 1-15.
(Continued)

*Primary Examiner* — Luan V Van
*Assistant Examiner* — Andrew Koltonow
(74) *Attorney, Agent, or Firm* — JCIPRNET

(57) ABSTRACT

Provided are a system and a method of treating wastewater. The system includes a wastewater chamber, positive and negative electrode chambers, acid and basic solution chambers and a buffer chamber. The wastewater chamber receives wastewater containing a first ion. The positive and the negative electrode chambers are respectively on opposite sides of the wastewater chamber. The acid chamber is between the wastewater chamber and the positive electrode chamber. The basic chamber is between the wastewater chamber and the negative electrode chamber. The buffer chamber is between one of the acid and the basic chambers and the wastewater chamber, and receives the buffer solution containing the first ion. The interfaces between the wastewater chamber and the buffer chamber and between the one of the acid and the basic chambers and the buffer chamber (Continued)

are ion exchange membranes having the same electrical properties.

10 Claims, 5 Drawing Sheets

(51) Int. Cl.
*B01D 61/46* (2006.01)
*C02F 101/12* (2006.01)
*C02F 101/10* (2006.01)

(52) U.S. Cl.
CPC .... *B01D 2313/32* (2013.01); *C02F 2101/101* (2013.01); *C02F 2101/12* (2013.01)

(56) References Cited

U.S. PATENT DOCUMENTS

| | | | | |
|---|---|---|---|---|
| 5,200,046 | A | * | 4/1993 | Chlanda ............ B01D 61/445 204/534 |
| 5,207,879 | A | * | 5/1993 | Butterworth ......... B01D 61/445 204/534 |
| 7,846,318 | B2 | | 12/2010 | Pratt et al. |
| 2009/0152117 | A1 | | 6/2009 | Akahori et al. |
| 2015/0315038 | A1 | | 11/2015 | Astle |
| 2018/0093030 | A1 | | 4/2018 | Hestekin et al. |

FOREIGN PATENT DOCUMENTS

| | | |
|---|---|---|
| CN | 109231623 | 1/2019 |
| TW | 201240923 | 10/2012 |
| TW | 201722855 | 7/2017 |
| WO | 2017071115 | 5/2017 |
| WO | 2017137748 | 8/2017 |

OTHER PUBLICATIONS

Karel Ghyselbrecht et al., "Desalination of an industrial saline water with conventional and bipolar membrane electrodialysis," Desalination, vol. 318, Jun. 3, 2013, pp. 9-18.

Narjes Keramati et al., "NaOH Recovery from MEROX Tower Waste Stream Using the Electrodialysis Process," Separation Science and Technology, vol. 46, Issue 1, 2010, pp. 27-32.

Dong Wang et al., "The Novel Strategy for Increasing the Efficiency and Yield of the Bipolar Membrane Electrodialysis by the Double Conjugate Salts Stress," Polymers (Basel), vol. 12, No. 2, Feb. 5, 2020, pp. 1-13.

Alexander M. Lopez et al., "Separation of organic acids from water using ionic liquid assisted electrodialysis," Separation and Purification Technology, vol. 116, Sep. 15, 2013, pp. 162-169.

Jiangnan Shen et al., "The use of BMED for glyphosate recovery from glyphosate neutralization liquor in view of zero discharge," Journal of Hazardous Materials, vol. 260, Sep. 15, 2013, pp. 660-667.

"Office Action of Taiwan Counterpart Application", dated Jul. 7, 2021, p. 1-p. 11.

* cited by examiner

SYSTEM AND METHOD OF TREATING WASTE WATER

BACKGROUND

Technical Field

The present disclosure relates to a system and a method of treating wastewater.

Description of Related Art

In the existing wastewater treating system, the electrodialysis (ED) device can convert the salts in the wastewater into acid solution and basic solution to achieve resource recovery and reduce environmental pollution.

In the traditional electrodialysis device with a bipolar membrane, an acid solution chamber, a wastewater chamber and a basic solution chamber are disposed in order. In the process of wastewater treatment, the concentration of cation in the acid solution chamber and the concentration of anion in the basic solution chamber increase with time, while the concentration of cation and anion in the wastewater chamber becomes lower and lower. Therefore, concentration polarization is occurred between the acid solution chamber and the wastewater chamber and between the basic solution chamber and the wastewater chamber, which leads to an increase in ion migration resistance and affects the efficiency of wastewater treatment. In addition, due to the concentration polarization, the cation in the acid solution chamber and the anion in the basic solution chamber diffuse back into the wastewater chamber, resulting in the inefficient recovery of the acid solution and the basic solution. In addition, since the traditional electrodialysis device with the bipolar membrane only has a standard anion exchange membrane and a standard cation exchange membrane, it is impossible to separate ions with the same electrical properties, such as chloride ions and sulfate ions, resulting in reduced purity of the recovered acid solution and basic solution.

SUMMARY

The present disclosure provides a system of treating wastewater, which includes a buffer chamber disposed between a wastewater chamber and an acid solution chamber and/or a basic solution chamber.

The present disclosure provides a method of treating wastewater which improves the wastewater treatment efficiency and the recovery efficiency of the acid solution and/or the basic solution by using a buffer chamber disposed between the wastewater chamber and the acid solution chamber and/or the basic solution chamber.

A system of treating wastewater of the present disclosure includes a wastewater chamber, a positive electrode chamber, a negative electrode chamber, an acid solution chamber, a basic solution chamber and a first buffer chamber. The wastewater chamber is used to receive wastewater containing a first ion. The positive electrode chamber and the negative electrode chamber are respectively disposed on opposite sides of the wastewater chamber. The acid solution chamber is disposed between the wastewater chamber and the positive electrode chamber. The basic solution chamber is disposed between the wastewater chamber and the negative electrode chamber. The first buffer chamber is disposed between the wastewater chamber and one of the acid solution chamber and the basic solution chamber, and is used to receive a first buffer solution containing the first ion. An interface between the wastewater chamber and the first buffer chamber is a first ion exchange membrane. An interface between the first buffer chamber and the one of the acid solution chamber and the basic solution chamber is a second ion exchange membrane. The first ion exchange membrane and the second ion exchange membrane have the same electrical properties. A concentration of the first ion in the first buffer solution is not lower than a target concentration of the first ion in the wastewater chamber, and not higher than a target concentration of the first ion in the one of the acid solution chamber and the basic solution chamber.

A method of treating wastewater of the present disclosure includes the following steps. Wastewater containing a first ion is provided to a wastewater treating system. The wastewater treating system includes a wastewater chamber, a positive electrode chamber, a negative electrode chamber, an acid solution chamber, a basic solution chamber and a first buffer chamber. The wastewater chamber is used to receive wastewater. The positive electrode chamber and the negative electrode chamber are respectively disposed on opposite sides of the wastewater chamber. The acid solution chamber is disposed between the wastewater chamber and the positive electrode chamber. The basic solution chamber is disposed between the wastewater chamber and the negative electrode chamber. The first buffer chamber is disposed between the wastewater chamber and one of the acid solution chamber and the basic solution chamber. A first buffer solution containing the first ion is provided to the first buffer chamber, wherein a concentration of the first ion in the first buffer solution is not lower than a target concentration of the first ion in the wastewater chamber, and not higher than a target concentration of the first ion in the one of the acid solution chamber and the basic solution chamber. Voltages are applied to the positive electrode chamber and the negative electrode chamber.

DESCRIPTION OF THE EMBODIMENTS

The terms mentioned in the text, such as "comprising", "including" and "having" are all open-ended terms, i.e., meaning "including but not limited to".

In addition, in the text, the range represented by "a value to another value" is a summary expression way to avoid listing all the values in the range one by one in the specification. Therefore, the record of a specific numerical range covers any numerical value within the numerical range, as well as a smaller numerical range defined by any numerical value within the numerical range.

In the embodiment of the present disclosure, the electrodialysis is used in the wastewater treating system to make the salt in the wastewater into acid solution and basic solution, so as to reduce the concentration of the salt in the wastewater to the required concentration (hereinafter the target concentration of the ions of the salt in wastewater). In addition, the wastewater treating system of the embodiment of the present disclosure includes a buffer chamber disposed between the wastewater chamber and the acid solution chamber and/or the basic solution chamber, so the cation in the acid solution chamber and the anion in the basic solution chamber may be prevented from being diffusing back into the wastewater chamber due to excessive concentration, and ions with the same electrical properties may be effectively separated. The wastewater treating system and the wastewater treating method of the present disclosure will be described in detail below.

Figure 1:
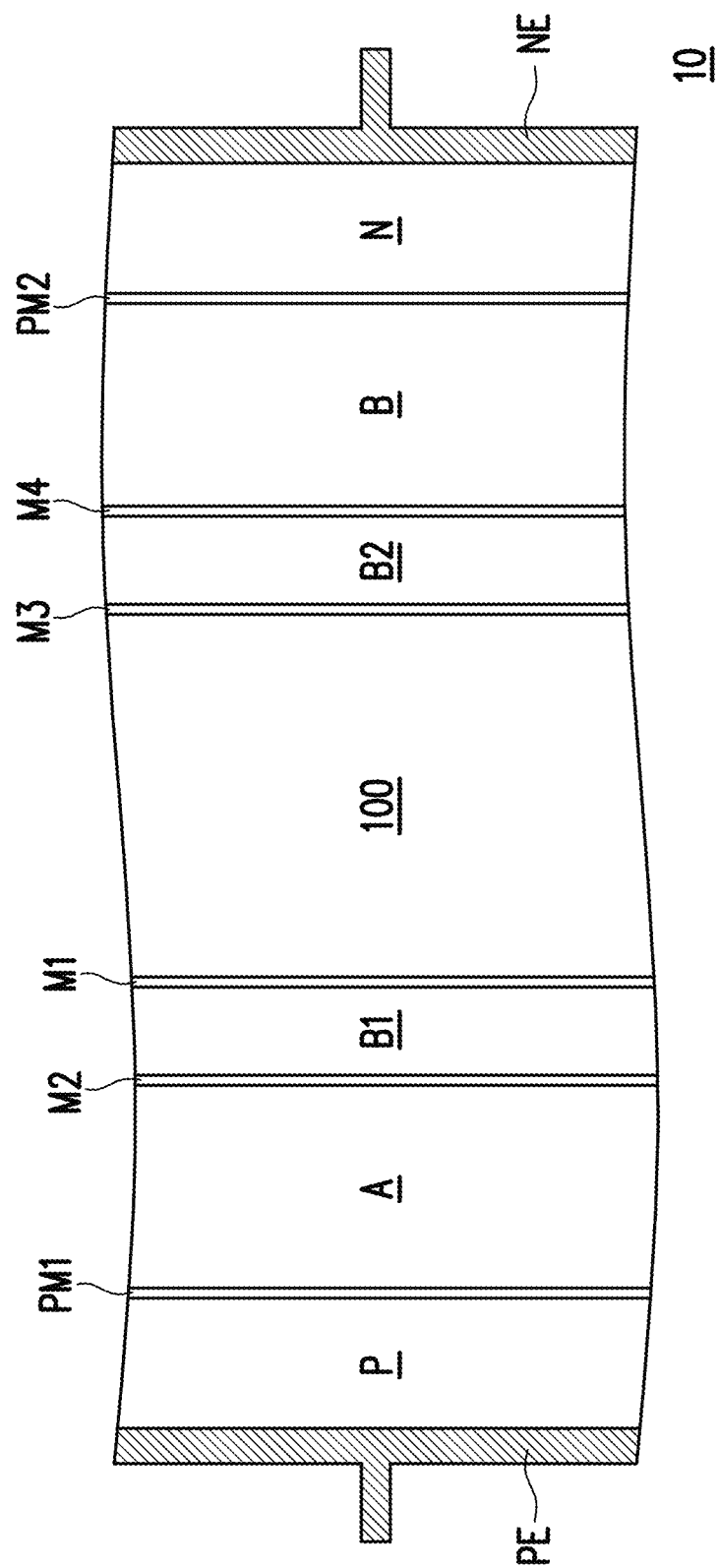
FIG. 1 is a schematic diagram of a system for treating the wastewater of an embodiment of the present disclosure.

FIG. 1 is a schematic diagram of a system for treating the wastewater of an embodiment of the present disclosure. Referring to FIG. 1, the wastewater treating system 10 of the embodiment of the present disclosure includes a wastewater chamber 100, a positive electrode chamber P, a negative electrode chamber N, an acid solution chamber A, a basic solution chamber B, a first buffer chamber B1 and a second buffer chamber B2. The wastewater chamber 100 is used to receive the salt-containing wastewater. The positive electrode chamber P and the negative electrode chamber N are respectively disposed on opposite sides of the wastewater chamber 100. The positive electrode chamber P is equipped with an electrode PE and is used to receive the electrode chamber solution (such as sodium sulfate solution). The negative electrode chamber N is equipped with an electrode NE and is used to receive the electrode chamber solution (such as sodium sulfate solution). When the voltages are applied to electrode PE and electrode NE, the anion of the salt in the wastewater may move toward the positive electrode, and the cation of the salt in the wastewater may move toward the negative electrode. In this way, the salt concentration in wastewater may be reduced to achieve the purpose of the wastewater treatment. In an embodiment, during the wastewater treatment, the current density is, for example, between 10 mA/cm$^2$ and 100 mA/cm$^2$. In this way, the salt concentration in wastewater may be reduced to achieve the purpose of the wastewater treatment.

The acid solution chamber A is disposed between the wastewater chamber 100 and the positive electrode chamber P, and is connected to the positive electrode chamber P. The acid solution chamber A is used to receive the aqueous solution (such as pure water) and the anion from the first buffer chamber B1, which will be described later. In the present embodiment, the interface between the acid solution chamber A and the positive electrode chamber P is a bipolar membrane PM1. The hydroxide ions (OW) in the bipolar membrane PM1 move toward the positive electrode and to the positive electrode chamber P, and the hydrogen ions (H$^+$) in the bipolar membrane PM1 and the anion from the first buffer chamber B1 form the acid solution in the acid solution chamber A. The acid solution concentration in the acid solution chamber A increases with the increase of the wastewater treatment time until the required acid solution concentration (hereinafter the target concentration of anion in the acid solution) is reached. At this time, the acid solution produced may be received from the acid solution chamber A to achieve the purpose of reuse of wastewater.

Similarly, the basic solution chamber B is disposed between the wastewater chamber 100 and the negative electrode chamber N, and is connected to the negative electrode chamber N. The basic solution chamber B is used to receive the aqueous solution (such as pure water) and the cation from the second buffer chamber B2, which will be described later. In the present embodiment, the interface between the basic solution chamber B and the negative electrode chamber N is a bipolar membrane PM2. The hydroxide ions (OH$^-$) in the bipolar membrane PM2 move toward the negative electrode and to the negative electrode chamber N, and the hydrogen ions (H$^+$) in the bipolar membrane PM2 and the cation from the second buffer chamber B2 form the basic solution in the basic solution chamber B. The basic solution concentration in the basic solution chamber B increases with the increase of the wastewater treatment time until the required basic solution concentration (hereinafter the target concentration of cation in the basic solution) is reached. At this time, the basic solution produced may be received from the basic solution chamber B to achieve the purpose of reuse of wastewater.

The first buffer chamber B1 is disposed between the acid solution chamber A and the wastewater chamber 100, and is connected to the acid solution chamber A and the wastewater chamber 100. The first buffer chamber B1 is used to receive a first buffer solution containing the same anion as the anion in the acid solution to be made, i.e., the anion to be recycled and reused in the wastewater. In the present embodiment, the interface between the first buffer chamber B1 and the wastewater chamber 100 is an anion exchange membrane M1, and the interface between the first buffer chamber B1 and the acid solution chamber A is an anion exchange membrane M2. In other words, the interface between the first buffer chamber B1 and the wastewater chamber 100 and the interface between the first buffer chamber B1 and the acid solution chamber A have the same electrical properties. In this way, during the wastewater treatment, the anions of salt in the wastewater move toward the positive electrode and into the first buffer chamber B1, and the anions in the first buffer chamber B1 same as the anions in the acid solution to be made move into the acid solution chamber A to form the acid solution with hydrogen ions from the bipolar membrane PM1.

In addition, in the present embodiment, the concentration of the anion in the first buffer solution is not lower than the target concentration of the same anion in the wastewater chamber 100 and not higher than the target concentration of the same anion in the acid solution chamber A. Since the anion concentration in the first buffer solution is between the target concentration in the wastewater chamber 100 and the target concentration in the acid solution chamber A, when the ion concentration in the wastewater chamber 100 decreases as the wastewater treatment time increases, the phenomenon that the water in the wastewater chamber 100 moves into the acid chamber A due to the excessive osmotic pressure difference between the acid chamber A and the wastewater chamber 100 may be slow down, so as to avoid the reduction of the recovery concentration of the acid solution. In addition, by the first buffer chamber B1, the ions in the acid chamber A may be prevented from returning to the wastewater chamber 100 due to the excessive ion concentration difference, so as to avoid the reduction of the efficiency of the wastewater treatment and the acid solution recovery. In addition, since the anion in the first buffer solution is the same as the anion in the acid solution to be made, even if there are multiple anions in the wastewater, these anions only move into the first buffer chamber B1, while the anion in the first buffer solution may move into the acid solution chamber A, which may improve the purity of the prepared acid solution.

Similarly, the second buffer chamber B2 is disposed between the basic solution chamber B and the wastewater chamber 100, and is connected to the basic solution chamber B and the wastewater chamber 100. The second buffer chamber B2 is used to receive a second buffer solution containing the same cation as the cation in the basic solution to be made, i.e., the cation to be recycled and reused in the wastewater. In the present embodiment, the interface between the second buffer chamber B2 and the wastewater chamber 100 is a cation exchange membrane M3, and the interface between the second buffer chamber B2 and the basic solution chamber B is a cation exchange membrane M4. In other words, the interface between the second buffer chamber B2 and the wastewater chamber 100 and the interface between the second buffer chamber B2 and the basic solution chamber B have the same electrical properties. In this way, during the wastewater treatment, the cations of salt in the wastewater move toward the negative electrode and into the second buffer chamber B2, and the cations in the second buffer chamber B2 same as the cations in the basic solution to be made move into the basic solution chamber B to form the basic solution with hydroxide ions from the bipolar membrane PM2.

In addition, in the present embodiment, the concentration of the cation in the second buffer solution is not lower than the target concentration of the same cation in the wastewater chamber 100 and not higher than the target concentration of the same cation in the basic solution chamber B. Since the cation concentration in the second buffer solution is between the target concentration in the wastewater chamber 100 and the target concentration in the basic solution chamber B, when the ion concentration in the wastewater chamber 100 decreases as the wastewater treatment time increases, the phenomenon that the water in the wastewater chamber 100 moves into the basic chamber B due to the excessive osmotic pressure difference between the basic chamber B and the wastewater chamber 100 may be slow down, so as to avoid the reduction of the recovery concentration of the basic solution. In addition, by the second buffer chamber B2, the ions in the basic chamber B may be prevented from returning to the wastewater chamber 100 due to the excessive ion concentration difference, so as to avoid the reduction of the efficiency of the wastewater treatment and the basic solution recovery. In addition, since the cation in the second buffer solution is the same as the cation in the basic solution to be made, even if there are multiple cations in the wastewater, these cations only move into the second buffer chamber B2, while the cation in the second buffer solution may move into the basic solution chamber B, which may improve the purity of the prepared basic solution.

In the embodiment of the present disclosure, the first buffer chamber B1 is disposed between the acid solution chamber A and the wastewater chamber 100, and the second buffer chamber B2 is disposed between the basic solution chamber B and the wastewater chamber 100. Therefore, the first buffer chamber B1 and the second buffer chamber B2 may reduce the concentration gap between the wastewater chamber 100 and the acid solution chamber A and the basic solution chamber B, respectively, and a concentration gradient is formed, so that the ions in the acid solution chamber A or in the basic solution chamber B may not move back to the wastewater chamber 100 and the osmotic pressure difference is reduced. In other words, if the first buffer chamber B1 is not disposed between the acid solution chamber A and the wastewater chamber 100 and/or the second buffer chamber B2 is not disposed between the basic solution chamber B and the wastewater chamber 100, the problem that reduced recovery efficiency of the acid solution and/or the basic solution due to a large concentration gap between the wastewater chamber 100 and the acid solution chamber A and/or the basic solution chamber B cannot be solved.

In addition, in the present embodiment, the first buffer chamber B1 and the second buffer chamber B2 are separated chambers, and the first buffer chamber B1 and the second buffer chamber B2 are communicated with each other. Therefore, the first buffer solution is the same as the second buffer solution, and both contain the anion needed to produce the acid solution and the cation needed to produce the basic solution. In another embodiment, the first buffer chamber B1 may be not communicated with the second buffer chamber B2. In this case, the first buffer solution is different from the second buffer solution.

The following will take the wastewater treating system 10 as an example to explain the wastewater treatment of the present disclosure.

Figure 2:
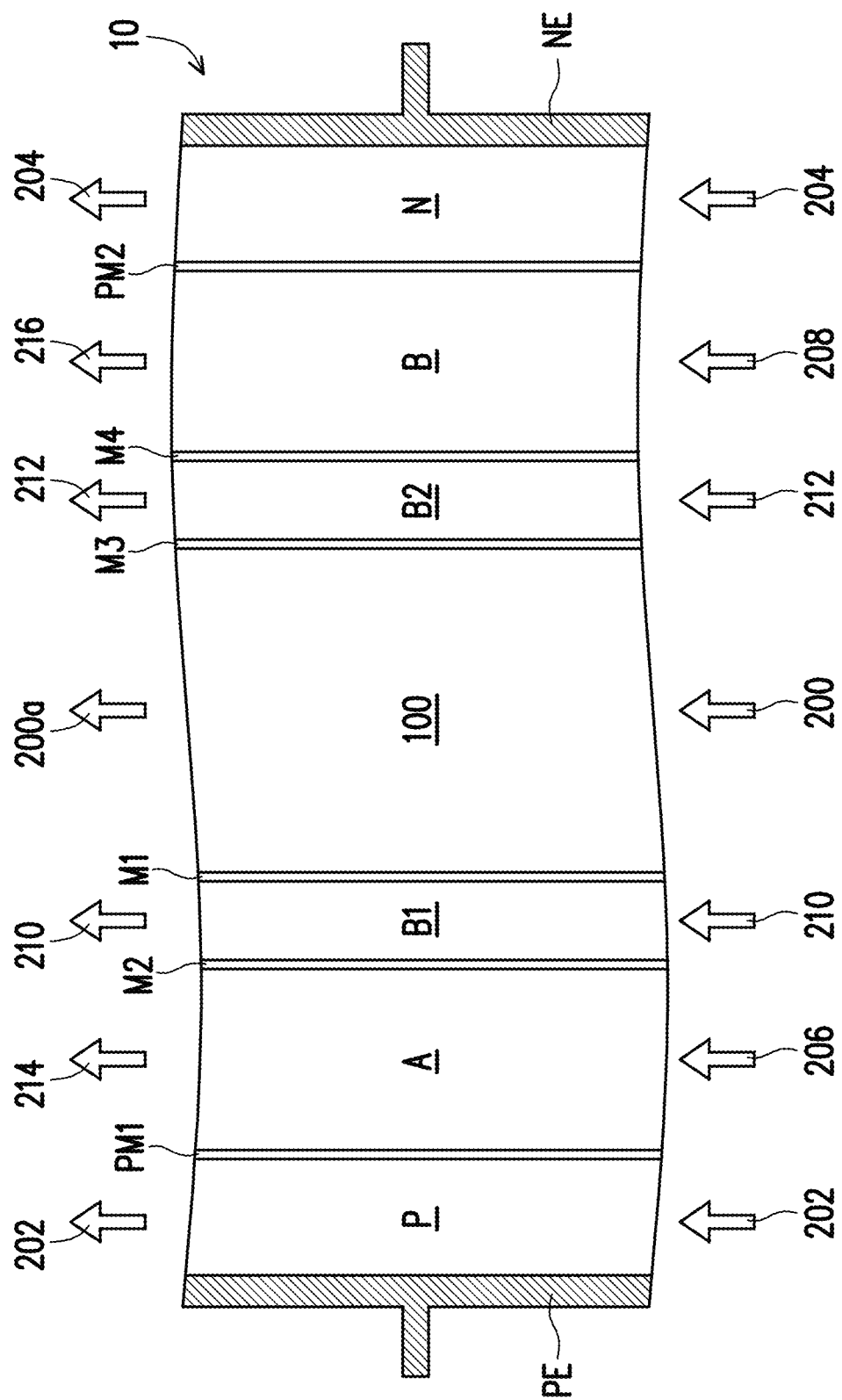
FIG. 2 is a schematic diagram of a wastewater treatment of an embodiment of present disclosure.
Figure 3:
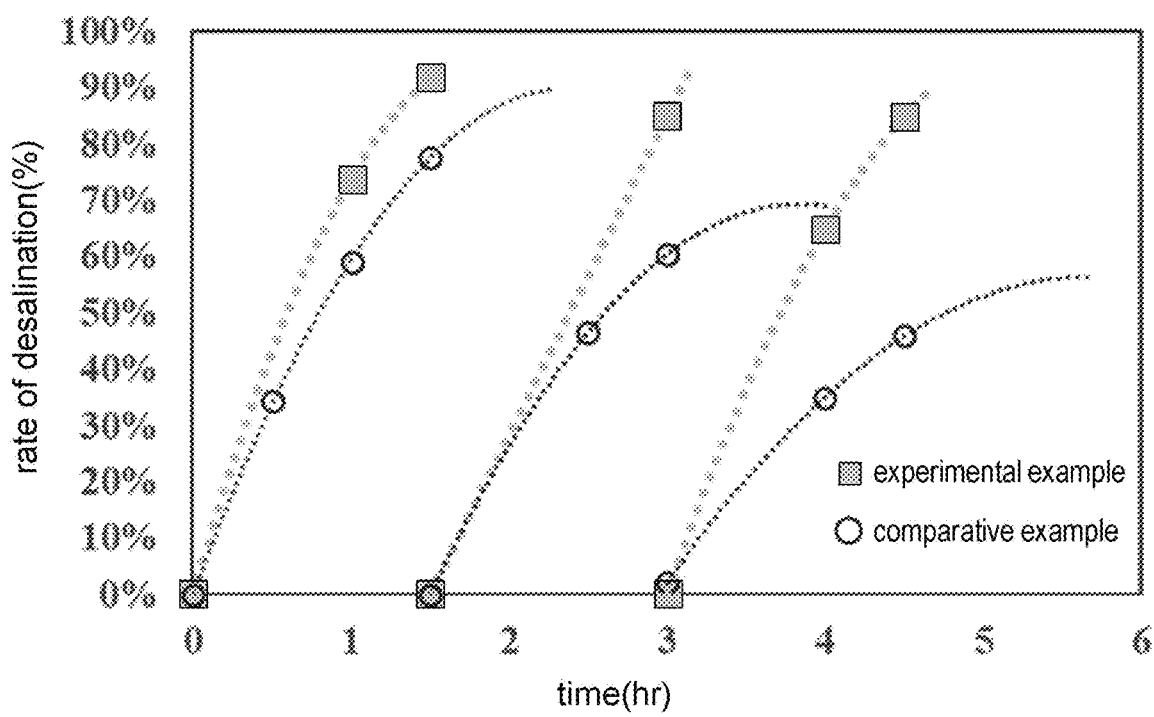
FIG. 3 is a comparison diagram of the rate of desalination of the wastewater of the experimental example and the comparative example.
Figure 4:
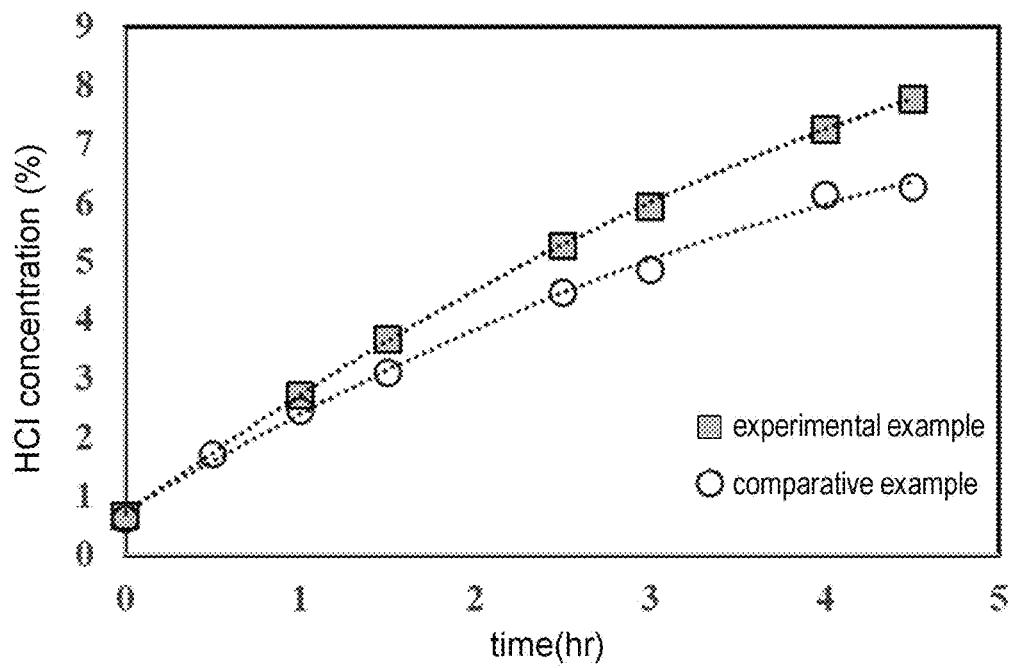
FIG. 4 is a comparison diagram of the concentration of hydrochloric acid produced in the experimental example and the comparative example.
Figure 5:
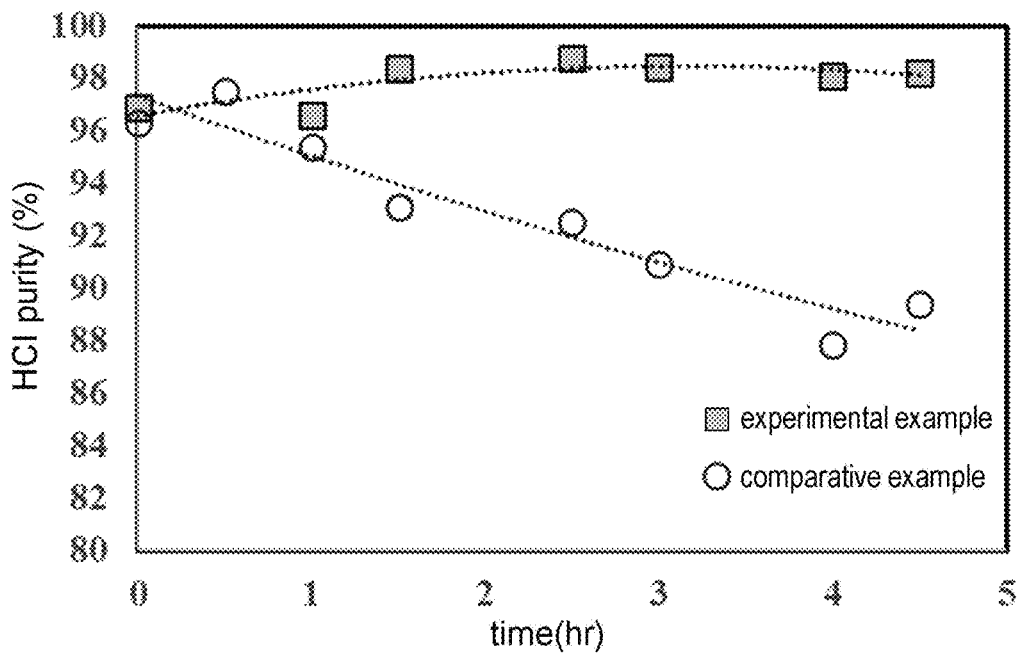
FIG. 5 is a comparison diagram of the purity of hydrochloric acid produced in the experimental example and the comparative example.
Figure 6:
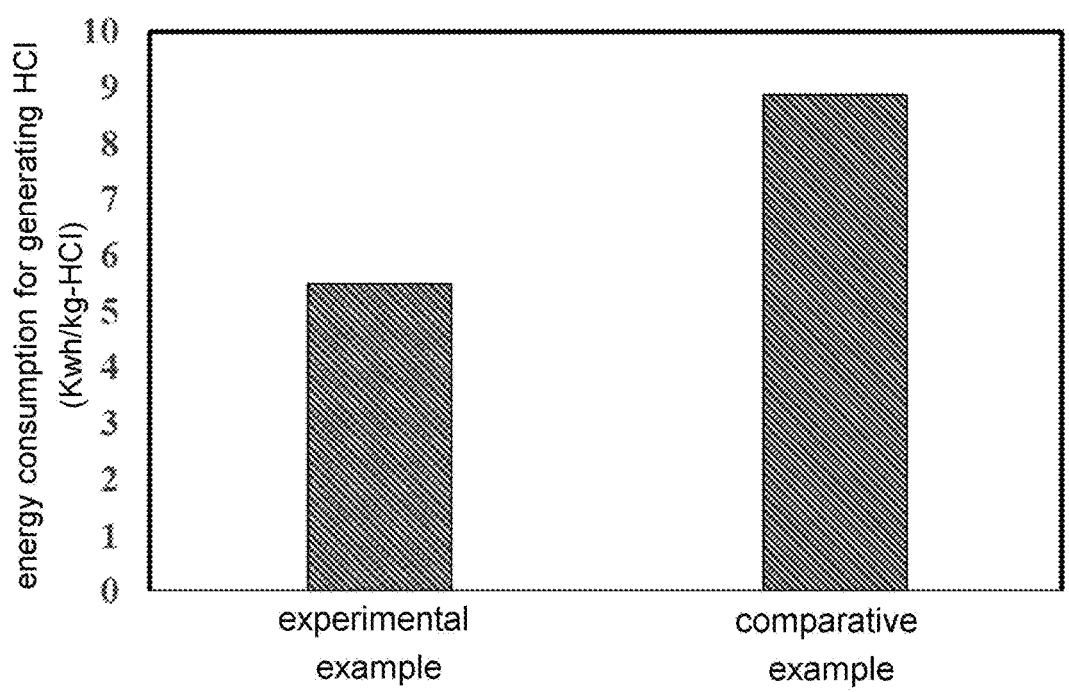
FIG. 6 is a comparison diagram of the energy consumption for generating hydrochloric acid in the experimental example and the comparative example.
Figure 7:
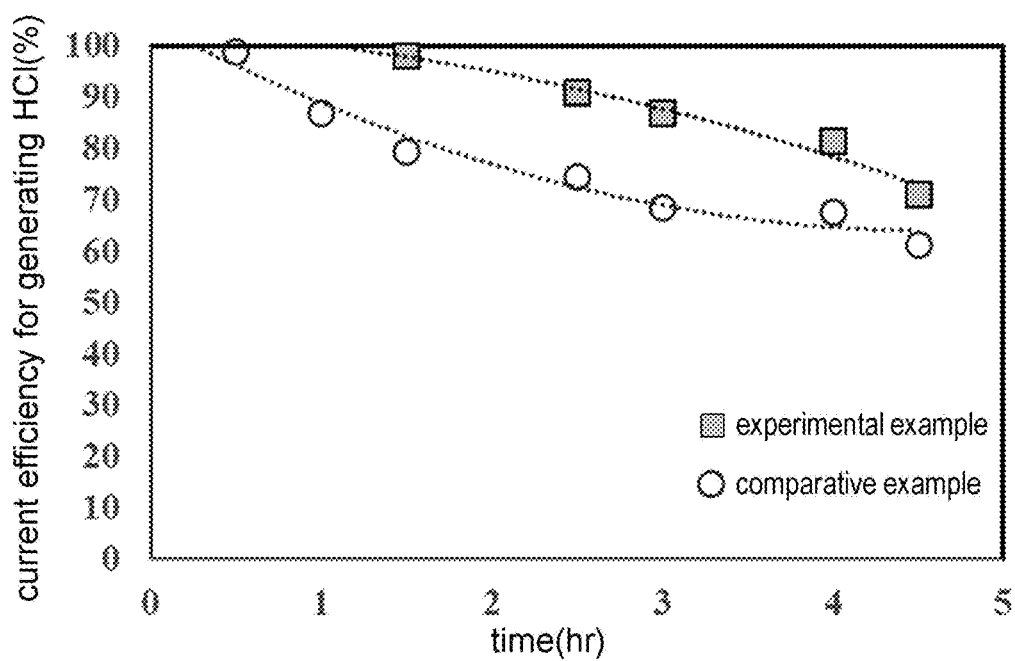
FIG. 7 is a comparison diagram of the current efficiency for generating hydrochloric acid in the experimental example and the comparative example.

FIG. 2 is a schematic diagram of a wastewater treatment of an embodiment of present disclosure. Referring to FIG. 2, the wastewater 200 containing salt is introduced into the wastewater chamber 100. The salt is, for example, sodium chloride, sodium sulfate, lithium chloride, lithium sulfate, potassium chloride, potassium sulfate or a combination thereof. In addition, the electrode chamber solution 202 (such as sodium sulfate solution) is introduced into the positive electrode chamber P, the electrode chamber solution 204 (such as sodium sulfate solution) is introduced into the negative electrode chamber N, the aqueous solution 206 (such as pure water) is introduced into the acid solution chamber A, the aqueous solution 208 (such as pure water) is introduced into the basic solution chamber B, the first buffer solution 210 is introduced into the first buffer chamber B1, and the second buffer solution 212 is introduced into the second buffer chamber B2. The anion contained in the first buffer solution 210 is depended on the type of anion in the acid solution 214 to be produced, and the cation contained in the second buffer solution 212 is depended on the type of cation in the basic solution 216 to be produced.

Depending on the first target concentration of salt in wastewater 200 after the wastewater treatment, the second target concentration of anion in the acid solution required, and the third target concentration of cation in the basic solution required, the required concentration of the anion in the first buffer solution 210 is between the first target concentration and the second target concentration, and the required concentration of the cation in the second buffer solution 212 is between the first target concentration and the third target concentration.

The voltages are applied to the positive electrode chamber P and the negative electrode chamber N through the electrode PE and the electrode NE. At this time, the hydroxide ions of the bipolar membrane PM1 move toward the positive electrode and into the positive electrode chamber P, the anions of the salt in wastewater 200 move from the wastewater chamber 100 toward the positive electrode and into the first buffer chamber B1, and the anions in the first buffer solution 206 (same as the anions in the acid solution to be made) move into the acid solution chamber A and form the acid solution 214 with the hydrogen ions from the bipolar membrane PM1. Then, the acid solution 214 is discharged. At the same time, the hydrogen ions of the bipolar membrane PM2 move toward the negative electrode and into the negative electrode chamber N, the cations of the salt in the wastewater 200 move from the wastewater chamber 100 to the negative electrode and into the second buffer chamber B2, the cations in the second buffer solution 208 (same as the cation in the basic solution to be made) move into the basic solution chamber B and form the basic solution 216 with the hydroxide ions from the bipolar membrane PM2. Then, the basic solution 216 is discharged. In this way, the discharged wastewater 200a has a lower salt concentration than the introduced-in wastewater 200, and the acid solution and the basic solution may be recovered from the acid solution chamber A and the basic solution chamber B. In addition, since the anion in the first buffer solution 206 is the same as the anion in the acid solution to be made, and the cation in the second buffer solution 208 is the same as the cation in the basic solution to be made, the acid solution with higher purity and the basic solution with higher purity may be obtained.

In the above-mentioned embodiments, the wastewater treating system 10 includes the first buffer chamber B1 and the second buffer chamber B2, so the purity and concentration of the acid solution and basic solution produced may be effectively improved, but the present disclosure is not limited thereto. In other embodiments, depending on actual needs, the wastewater treating system may only include the first buffer chamber B1 or the second buffer chamber B2.

The following will illustrate the wastewater treating system and the wastewater treating method of present disclosure with the experimental example and the comparative example.

Experimental Example

The wastewater treating system 10 of the embodiment of the present disclosure was used. 1 L of wastewater containing 1.3% NaCl and 0.7% $Na_2SO_4$ was introduced to the wastewater chamber 100. 0.25 L of HCl (0.2 M) was contained in the acid solution chamber A, and 0.25 L of NaOH (0.2 M) was contained in the basic solution chamber B. 0.3M of $Na_2SO_4$ was contained in the positive electrode chamber P and the negative electrode chamber N, and 1 L of NaCl (5%) buffer solution was contained in the first buffer chamber B1 and the second buffer chamber B2. In addition, the operating current density was 30 $mA/cm^2$.

Comparative Example

Except for using the wastewater treating system without the buffer chamber and the buffer solution, the other conditions were the same as those in the experimental example.

In the experimental example and the comparative example, wastewater was introduced 3 times, and each time lasting for 1.5 hours. The results are shown in FIGS. 3 to 7. According to the result shown in FIG. 3, the experimental example has a significantly higher rate of desalination (reduced from 92% to 85%) compared to the rate of desalination of the comparative example (77% reduced to 45%), and the rate of desalination in the experimental example may no be significantly decreased with the increase of time. In addition, according to the results shown in FIGS. 4 and 5, the concentration of hydrochloric acid produced is 7.8% and the purity of hydrochloric acid produced is 98% in the experimental example, which are significantly higher than the concentration (6.3%) and purity (89%) of hydrochloric acid in the comparative example. Furthermore, according to the results shown in FIGS. 6 and 7, the energy consumption and current efficiency during hydrochloric acid produced in the experimental example are significantly better than those in the comparative example.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A system of treating wastewater, comprising:
a wastewater chamber, receiving wastewater containing a first ion and a second ion;
a positive electrode chamber and a negative electrode chamber, respectively disposed on opposite sides of the wastewater chamber;
an acid solution chamber, disposed between the wastewater chamber and the positive electrode chamber;
a basic solution chamber, disposed between the wastewater chamber and the negative electrode chamber;
a first buffer chamber, disposed between the wastewater chamber and the acid solution chamber, and receiving a first buffer solution containing the first ion; and
a second buffer chamber, disposed between the wastewater chamber and the basic solution chamber, and receiving a second buffer solution containing the second ion,
wherein an interface between the wastewater chamber and the first buffer chamber is a first ion exchange membrane, an interface between the first buffer chamber and the acid solution chamber is a second ion exchange membrane, and the first ion exchange membrane and the second ion exchange membrane have a first electrical polarity,
wherein an interface between the wastewater chamber and the second buffer chamber is a third ion exchange membrane, an interface between the second buffer chamber and basic solution chamber is a fourth ion exchange membrane, and the third ion exchange membrane and the fourth ion exchange membrane have a second electrical polarity opposite to the first electrical polarity,
wherein the first ion exchange membrane allows the first ion contained in the wastewater to pass through to reach into the first buffer chamber from the wastewater chamber, and the second ion exchange membrane allows the first ion contained in the first buffer solution in the first buffer chamber to pass through to reach into the acid solution chamber,
wherein the third ion exchange membrane allows the second ion contained in the wastewater to pass through to reach into the second buffer chamber from the wastewater chamber, and the fourth ion exchange membrane allows the second ion contained in the second buffer solution in the second buffer chamber to pass through to reach into the basic solution chamber, and
wherein a concentration of the first ion in the first buffer solution is higher than a target concentration of the first ion in the wastewater chamber, and lower than a target concentration of the first ion in of the acid solution chamber, and a concentration of the second ion in the second buffer solution is higher than a target concentration of the second ion in the wastewater chamber, and lower than a target concentration of the second ion in the basic solution chamber.

2. The system of treating wastewater of claim 1, wherein an interface between the acid solution chamber and the positive electrode chamber is a bipolar membrane.

3. The system of treating wastewater of claim 1, wherein an interface between the basic solution chamber and the negative electrode chamber is a bipolar membrane.

4. The system of treating wastewater of claim 1, wherein the first buffer chamber is communicated with the second buffer chamber, and the first buffer solution is the same as the second buffer solution.

5. The system of treating wastewater of claim 1, wherein the first buffer chamber is separated from the second buffer chamber, and the first buffer solution is different from the second buffer solution.

6. A method of treating wastewater, comprising:
providing wastewater containing a first ion and a second ion to a wastewater treating system, wherein the wastewater treating system comprises:
a wastewater chamber, receiving the wastewater;
a positive electrode chamber and a negative electrode chamber, respectively disposed on opposite sides of the wastewater chamber;
an acid solution chamber, disposed between the wastewater chamber and the positive electrode chamber;
a basic solution chamber, disposed between the wastewater chamber and the negative electrode chamber;
a first buffer chamber, disposed between the wastewater chamber and one of the acid solution chamber and the basic solution chamber, and receiving a first buffer solution containing the first ion; and
a second buffer chamber, disposed between the wastewater chamber and the basic solution chamber, and receiving a second buffer solution containing the second ion,
providing the first buffer solution containing the first ion to the first buffer chamber and providing the second buffer solution containing the second ion to the second buffer chamber, wherein a concentration of the first ion in the first buffer solution is higher not lower than a target concentration of the first ion in the wastewater chamber, and lower not higher than a target concentration of the first ion in the one of the acid solution chamber and the basic solution chamber, and a concentration of the second ion in the second buffer solution is higher than a target concentration of the second ion in the wastewater chamber, and lower than a target concentration of the second ion in the basic solution chamber; and applying voltages to the positive electrode chamber and the negative electrode chamber,
wherein an interface between the wastewater chamber and the first buffer chamber is a first ion exchange membrane, an interface between the first buffer chamber and the acid solution chamber is a second ion exchange membrane, and the first ion exchange membrane and the second ion exchange membrane have a first electrical polarity,
wherein an interface between the wastewater chamber and the second buffer chamber is a third ion exchange membrane, an interface between the second buffer chamber and basic solution chamber is a fourth ion exchange membrane, and the third ion exchange membrane and the fourth ion exchange membrane have a second electrical polarity opposite to the first electrical polarity,
wherein the first ion exchange membrane allows the first ion contained in the wastewater to pass through to reach into the first buffer chamber from the wastewater chamber, and the second ion exchange membrane allows the first ion contained in the first buffer solution in the first buffer chamber to pass through to reach into the acid solution chamber, and
wherein the third ion exchange membrane allows the second ion contained in the wastewater to pass through to reach into the second buffer chamber from the wastewater chamber, and the fourth ion exchange membrane allows the second ion contained in the second buffer solution in the second buffer chamber to pass through to reach into the basic solution chamber.

7. The method of treating wastewater of claim 6, wherein an interface between the acid solution chamber and the positive electrode chamber is a bipolar membrane.

8. The method of treating wastewater of claim 6, wherein an interface between the basic solution chamber and the negative electrode chamber is a bipolar membrane.

9. The method of treating wastewater of claim 6, wherein the first buffer chamber is communicated with the second buffer chamber, and the first buffer solution is the same as the second buffer solution.

10. The method of treating wastewater of claim 6, wherein the first buffer chamber is separated from the second buffer chamber, and the first buffer solution is different from the second buffer solution.

* * * * *